UNITED STATES PATENT OFFICE.

J. BURROWS HYDE, OF NEW YORK, N. Y., ASSIGNOR TO ANNA M. HYDE.

IMPROVEMENT IN CONVERTING PEAT INTO CHARCOAL.

Specification forming part of Letters Patent No. 20,758, dated June 29, 1858.

*To all whom it may concern:*

Be it known that I, JOSHUA BURROWS HYDE, a citizen of the United States of North America, domiciliated in the city, county, and State of New York, but now temporarily residing in London, England, have invented or discovered the adaptability of a certain natural product to several useful purposes, which I believe not to have been known prior to my said discovery; and I do declare the following to be a full and exact description of my said invention, which consists in the employment of a substance found in a natural state in America, and particularly in the State of New Jersey, where it is dug from the earth in a soft plastic condition.

This substance is found at or near the surface of the earth and extending to the depth of several feet. It is of a dark umber color, free for the most part from vegetable or ligneous appearance, and when first taken up is of a soapy consistency, being composed of fine particles rendered paste-like by moisture. On the surface where exposed to the sun and air it dries into a substance resembling dark-brown earth. The sample sent herewith is from a locality in the town of Aquackanock, county of Passaic, and State of New Jersey. It is highly carbonaceous, contains a percentage of ammonia, but is free from bituminous character, and yields on distillation carbureted-hydrogen gas, with tar and ammoniacal liquor. When properly treated it forms a superior powder for facing of molds for casting metals; and it is likewise, when properly treated, highly advantageous for mixing with powdered manures—such as phosphate of lime, poudrettes, guano, fish, &c.—as well as valuable as a corpus for mixing with compound of caoutchouc and gutta-percha with other substances, and is particularly adapted for being converted into powdered charcoal for various uses in the arts by a peculiar process, and which process forms the subject-matter of this my application for which I wish to secure Letters Patent.

I excavate the material by any convenient means and expose it to dry upon raised platforms, of one or more tiers, provided with a covering to shut out the rain; but these platforms do not form any part of my invention, as they have been before used for similar purposes.

After the material has been partially dried on the platforms it may be passed through proper mills for reducing the size of the lumps, when it should be again exposed on the platforms, and when dried is in a state to be carbonized; or I pass it first through a mill to grind it finer and sift it in bolting-machines, if necessary, and before carbonizing expose it to artificial heat for further desiccation, for which I employ a drying-chamber of brick, with a series of small iron doors on one side and in tiers of four or five, more or less, one above another. Corresponding with these doors are iron bars, placed horizontally inside and across the chamber, on which to slide and rest the material in iron cases when it is exposed to the heat from similar cases which have been drawn hot from the carbonizing chambers or retorts. In the top of this chamber (which should be opposite or near to the retorts) is an opening, conducting the excess heat to such other drying apartment as may be necessary or convenient for auxiliary purposes. The size of the chamber should suit the size of the cases, which should be kept at least six inches asunder all around.

The carbonizing-retort may be of brick, fire-clay, or iron, and of any convenient size and shape for the purpose required, but must be provided with proper means for heating, as well as to receive the carbonizing cases, and capable of being closed tight, similar to common gas-retorts for carbureted-hydrogen gas.

Into the top of the carbonizing-chambers I introduce a metallic pipe, which leads into a vessel to contain the tar and ammoniacal liquor, which distills over and condenses, and from this vessel I lead a pipe or pipes for the passage of the gas distilled over, which I conduct either into the drying-chamber to assist by its combustion the heat there, or into the furnace to aid the heat there. To the pipe leading to the tar-vessel I attach a small tube with a stop-cock, by which I learn, when the gas has ceased flowing, that the carbonization is complete and the case ready for removal and to be substituted by another. The tar used may be entirely dispensed with and the distilled matters all passed to the furnace or drying-chamber with equal effect.

The cases should be of cast or wrought iron, and of such size as will be convenient to handle—say five feet long, two feet wide, and one foot deep—open at top nearly the entire length, and provided with a movable sheet-iron cover to close the opening and exclude the air when removed from the retort. These cases do not form a part of my invention, as carbonization in movable cells which may be filled with the material to be carbonized, and which can be placed in and removed from the retorts for certain purposes of carbonization, have been before employed.

In the process specified I proceed as follows: The material, having been properly prepared as described, is placed in the drying-chamber, which should be filled. I then withdraw from the lower tier the proper number to fill the retorts, (which should be at a red heat,) and quickly close them as the cases are placed therein. When the material has parted with its gaseous property, as ascertained by the testing-pipe, the retort should be opened, the cover laid over the case to exclude the air, and the case withdrawn and placed with its contents in the drying-chamber, from which a fresh case is taken and placed in the retort, as before. The doors of the drying-chamber should be kept open as short time as possible. When the carbonized charger in the drying-chamber has parted with its incandescence the case should be withdrawn therefrom and left to stand covered a short time in the open air to thoroughly cool, when the contents may be discharged and the case be refilled with fresh material and placed again in the drying-chamber, as before described, which forms the "round" of the process.

What I claim, and desire to secure by Letters Patent, is—

The process herein described of converting peaty matters into charcoal by previously submitting them to heat in a drying-chamber, described and heated as set forth herein, and by carbonizing the material and subsequently cooling the same in the manner set forth.

J. BURROWS HYDE.

In presence of—
  JOHN S. HOLLINGSHEAD,
  A. POLLOK.